Sept. 16, 1941.  J. J. FLICKINGER  2,256,258
CLUTCH
Filed Oct. 4, 1940  3 Sheets—Sheet 2

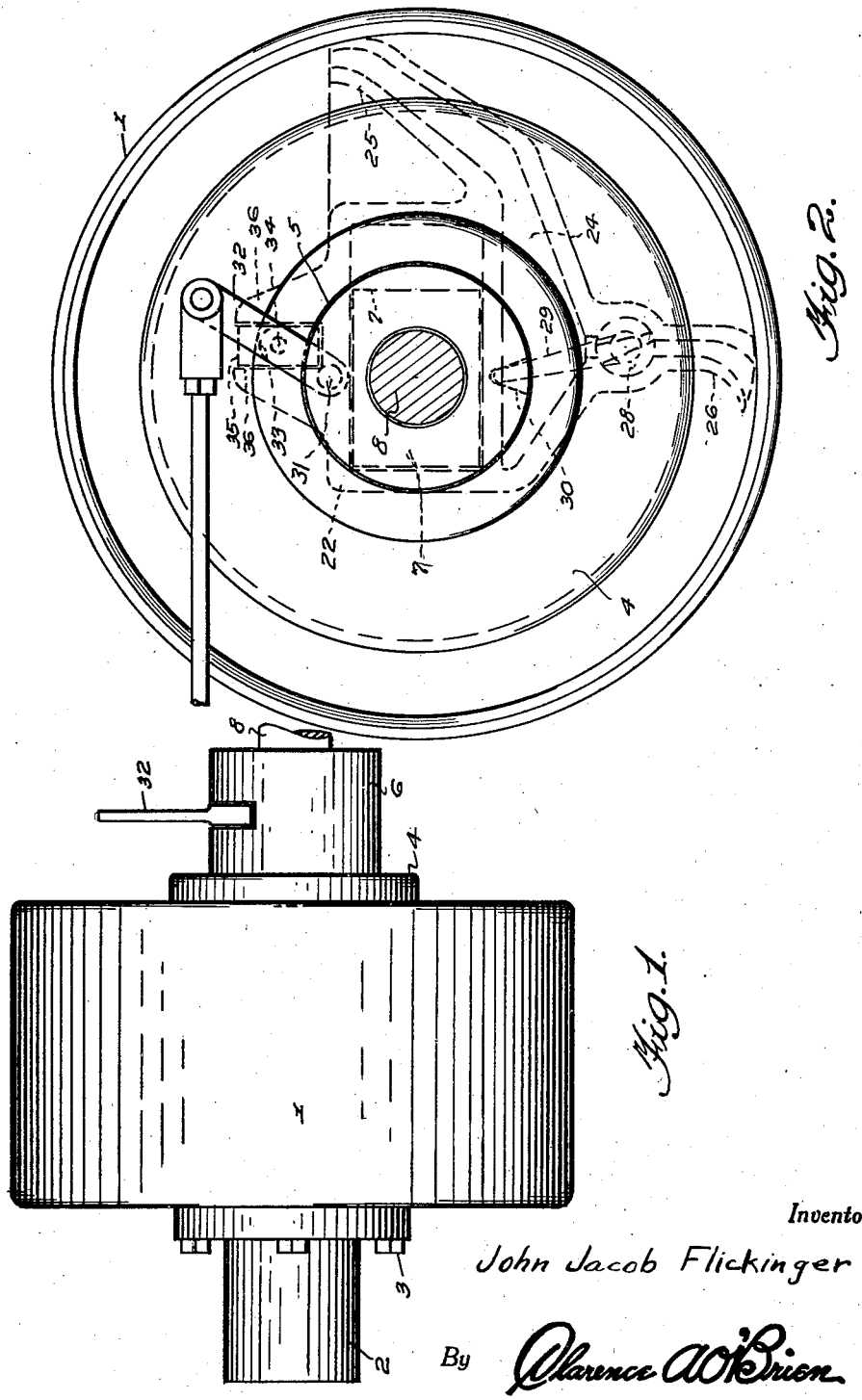

Inventor
John Jacob Flickinger

By *Clarence A. O'Brien*

Attorney

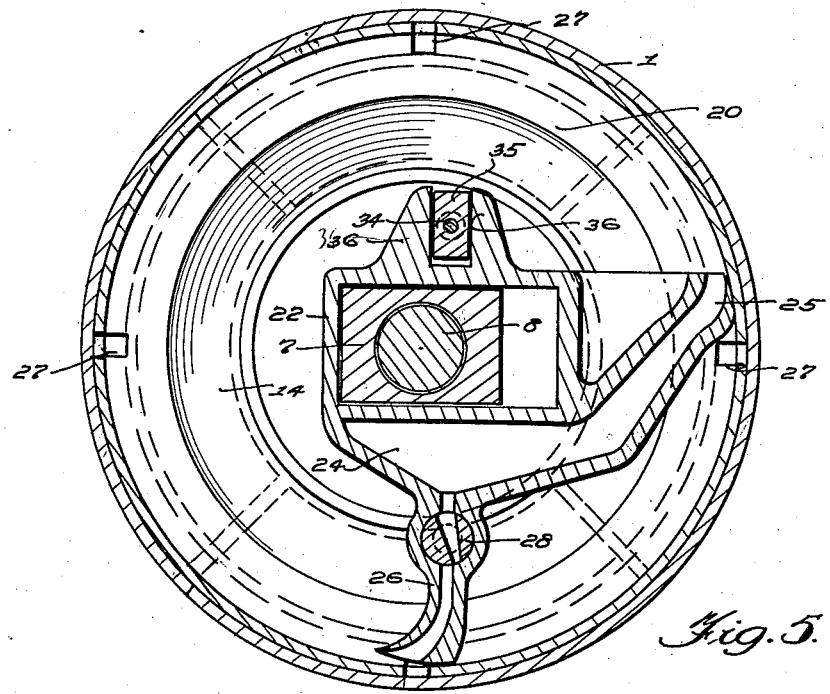
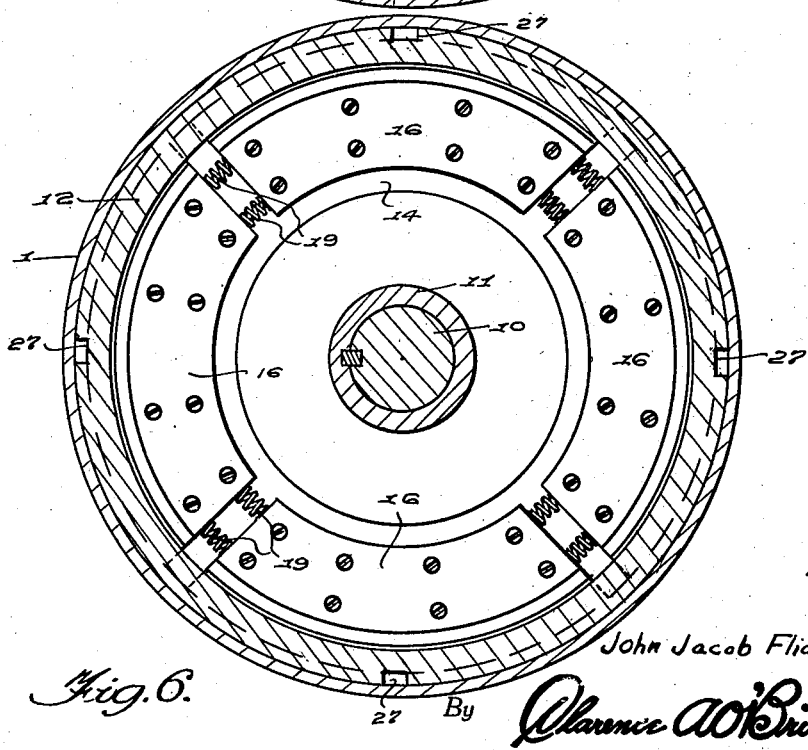

Patented Sept. 16, 1941

2,256,258

UNITED STATES PATENT OFFICE 2,256,258

CLUTCH

John Jacob Flickinger, Massillon, Ohio, assignor of one-tenth to Raymond O. Morgan, Orrville, Ohio Application October 4, 1940, Serial No. 359,809

3 Claims. (Cl. 192—85)

The present invention relates to new and useful improvements in clutches and has for its primary object to provide, in a manner as hereinafter set forth, a device of this character embodying a novel construction and arrangement through the medium of which mercury, acting under the influence of centrifugal force, is utilized for engaging the clutch.

Another very important object of the invention is to provide a mercury clutch of the aforementioned character which embodies unique means for manually controlling the device.

Other objects of the invention are to provide a clutch of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a clutch constructed in accordance with the present invention.

Figure 2 is a view in rear elevation of the device.

Figure 5 is a cross sectional view, taken substantially on the line 5—5 of Figure 3.

Figure 6 is a cross sectional view, taken substantially on the line 6—6 of Figure 3.

Figure 3:
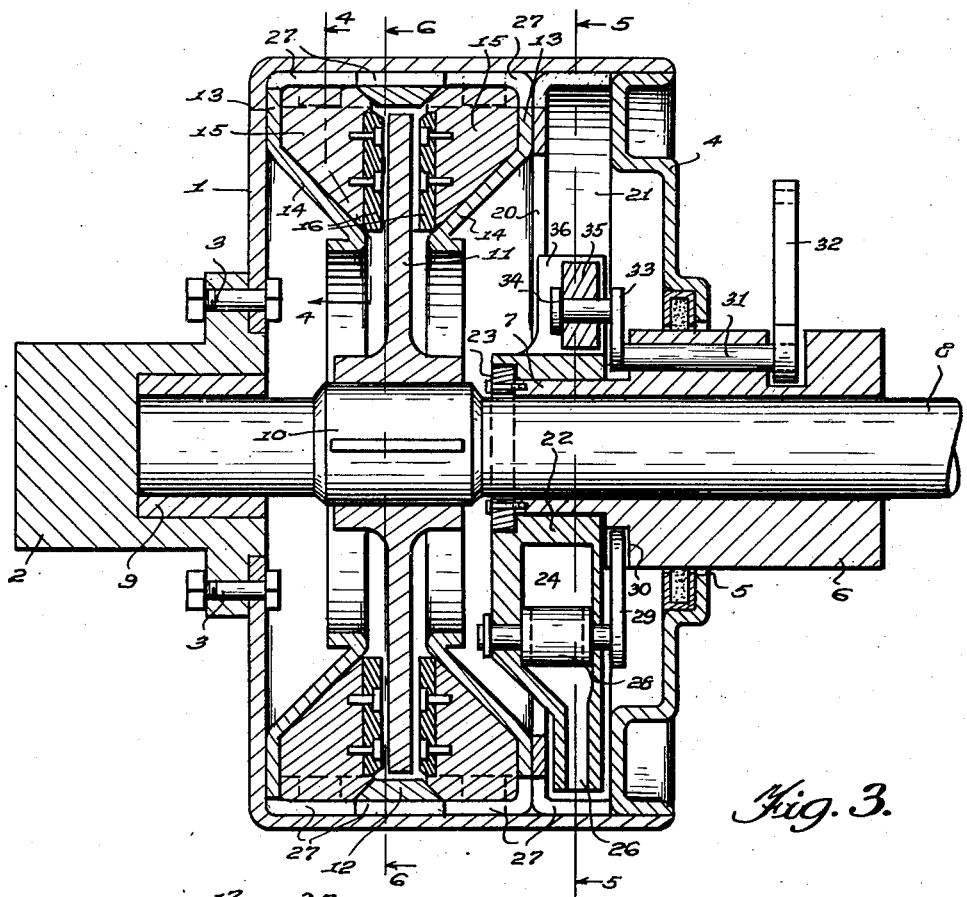
Figure 3 is a vertical longitudinal sectional view.
Figure 4:
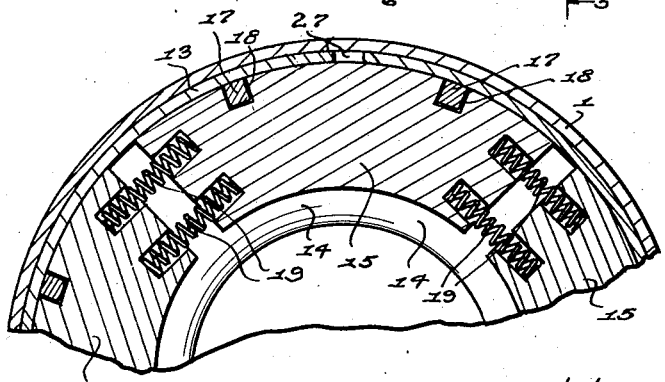
Figure 4 is a fragmentary view in cross section, taken substantially on the line 4—4 of Figure 3.

Referring now to the drawings in detail, it will be seen that the embodiment of the invention which has been illustrated comprises a substantially drum shaped housing 1 of suitable metal which is secured on a drive member 2 by bolts 3. A closure plate 4 is welded in the rear end portion of the housing, said closure being provided with a centrally located opening 5.

The opening 5 accommodates a stationary sleeve 6 which projects into the rear portion of the housing 1. Any suitable supporting means may be provided for the stationary sleeve 6. The sleeve 6 terminates in a substantially rectangular inner portion 7 the purpose of which will be presently set forth. The rectangular portion 7 of the sleeve 6 is transversely disposed in the housing 1. Extending rotatably through the sleeve 6 into the housing 1 is a driven shaft 8 having its forward end portion journaled in a bearing 9 provided therefor in the member 2. The shaft 8 includes an enlargement 10 having keyed thereon a disc 11 of suitable metal which is operable in the housing 1. A ring 12 is fixed in the housing 1 adjacent the periphery of the disc 11.

Fixed in the housing 1 on opposite sides of the ring 12 and the disc 11 are shoe retaining casings 13 which, as illustrated to advantage in Figure 3 of the drawings, are substantially channel shaped in cross section and include conical inner portions 14. Operable in the annular, substantially channel shaped casings 14 are segmental shoes 15 having mounted on their inner faces linings 16 for frictional engagement with the faces of the disc 11. It will be observed that the shoes 15 conform substantially in cross section to the shape of the annular retaining casings 14.

Thus, when the shoes 15 are moved inwardly on the portions 14 of the casings 13, said shoes are caused to frictionally engage the disc 11. Lugs 17 in the outer portions of the casings 13 are engaged in recesses 18 in the shoes 15 for positively connecting said shoes to the housing 1 for rotation therewith. Coil springs 19 between the ends of the shoe segments 15 yieldingly urge said shoe segments toward expanded or disengaged position.

Between the rear shoe retaining casing 13 and the closure plate 4 is a metallic spacing ring 20 of angle iron cross section. The ring 20, in conjunction with the plate 4, defines an annular channel or groove 21 in the rear portion of the housing 1.

Mounted for lateral sliding movement on the portion 7 of the sleeve 6 is what may be referred to as a substantially rectangular metallic carriage or member 22. A plate or the like 23 retains the carriage 22 on the portion 7 of the sleeve 6. The lower portion of the carriage 22 is formed to provide a mercury chamber 24. Projecting from one side of the carriage 22 is a tubular scoop 25 which communicates with the chamber 24 and which is engageable in the channel 21 for removing the mercury therefrom. Depending from the chamber 24 is a discharge spout 26 which is adapted to return the mercury to the channel 21 when it is desired to engage the clutch. Communicating passages 27 in the elements 20, 13 and 12 communicate with the channel 21 for conducting the mercury into the outer portions of said elements 13 for engaging the shoes 15 with the disc 11. The mercury also returns to the channel 21 through the passages 27 when the clutch is being disengaged.

A valve 28 controls the mercury discharge spout 26. The valve 28 comprises an operating arm 29 which is engaged in a recess or socket 30 which is provided therefor in the stationary sleeve 6.

Journaled longitudinally in the stationary sleeve 6 is a shaft 31. Fixed on the rear end portion of the shaft 31 is an operating lever 32. Fixed on the forward end portion of the shaft 31, in the housing 1, is an arm 33 which carries a headed pin 34. Journaled on the pin 34 is a block 35 which is engaged between a pair of spaced, opposed lugs 36 which rise from the carriage 22. Thus, when the shaft 31 is rocked the carriage 22 is shifted horizontally on the substantially rectangular portion 7 of the stationary sleeve 6. As the carriage 22 is shifted in this manner the valve 28 is opened and closed by reason of the fact that the free end portion of the arm 29 is engaged in the recess 30 in the stationary sleeve 6.

It is thought that the operation of the clutch will be readily apparent from a consideration of the foregoing. The mercury (not shown) is stored in the chamber 24 when the clutch is disengaged. With the mercury in the chamber 24 the shoes 15 are free of the disc 11 and it will thus be seen that the housing 1 is freely rotatable relative to the shaft 8. When it is desired to engage the clutch the shaft 31 is rotated in a direction to shift the carriage 22 from the reader's right to left as viewed in Fig. 5 of the drawings. Thus, the tubular scoop 25 is moved inwardly away from the channel 21 and the valve 28 is opened for permitting the mercury to flow from the chamber 24 into said channel 21. Of course, up to this point the housing 1 is rotating and the shaft 8 is stationary. When the mercury enters the channel 21 it flows through the passages 27 and is driven by centrifugal force into the outer portions of the shoe retaining casings 13. The comparatively heavy mercury forces the shoes 15 inwardly into frictional engagement with the opposite sides of the discs 11 and in this manner said disc with the shaft 8 is coupled to the housing 1 for rotation therewith. The construction and arrangement is such that the engagement of the clutch is smooth and gradual. When it is desired to disengage the clutch the carriage 22 is shifted from left to right as viewed in Fig. 5 of the drawings. When this occurs the valve 28 is closed and the tubular scoop 25 is engaged in the channel 21. As the housing 1 with the mercury therein rotates, said mercury is picked up by the scoop 25 from the channel 21 and returned to the chamber 24. During this operation the mercury in the casings 13 behind the shoes 15 flows back through the passages 27 into the channel 21. The shoes 15 are then disengaged from the disc 11 by centrifugal force with the assistance of the coil springs 19.

It is believed that the many advantages of a clutch constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A clutch comprising a rotary housing, a shaft extending rotatably into said housing, a disc fixed on said shaft in the housing, annular casings of substantially channel shaped cross section fixed in the housing on the opposite sides of the disc, segmental shoes operable in said casings and engageable with the disc for connecting the shaft to the housing for rotation therewith, and a comparatively heavy fluid in the housing engageable by centrifugal force with the shoes for engaging said shoes with the disc.

2. A clutch comprising a rotary housing, a shaft extending rotatably into said housing, a disc fixed on said shaft in the housing, shoes in the housing engageable with the disc for connecting the shaft to the housing for rotation therewith, a fluid in the housing engageable by centrifugal force with the shoes for engaging said shoes with the disc, and manually operable means for controlling said fluid, said means including a shiftable chamber in the housing for the reception of the fluid, a scoop projecting from the chamber into the housing for receiving the fluid therefrom and conducting said fluid into the chamber, and manually operable means for shifting said chamber.

3. A clutch comprising a rotary housing, a shaft extending rotatably into said housing, a disc fixed on said shaft in the housing, shoes in the housing engageable with the opposite sides of the disc for frictionally connecting the shaft to the housing for rotation therewith, a comparatively heavy fluid in the housing engageable by centrifugal force with the shoes for engaging said shoes with the disc, the housing having a channel therein for the reception of the fluid, a shiftable chamber in the housing for the reception of the fluid, a scoop on the chamber engageable in the channel for removing the fluid therefrom and conducting said fluid into said chamber, a conduit for returning the fluid to the channel from the chamber, a valve controlling said conduit, means for shifting the chamber for moving the scoop into and out of the channel, and means for closing and opening the valve as the scoop is shifted toward or away from the channel.

JOHN JACOB FLICKINGER.